Patented Aug. 26, 1941

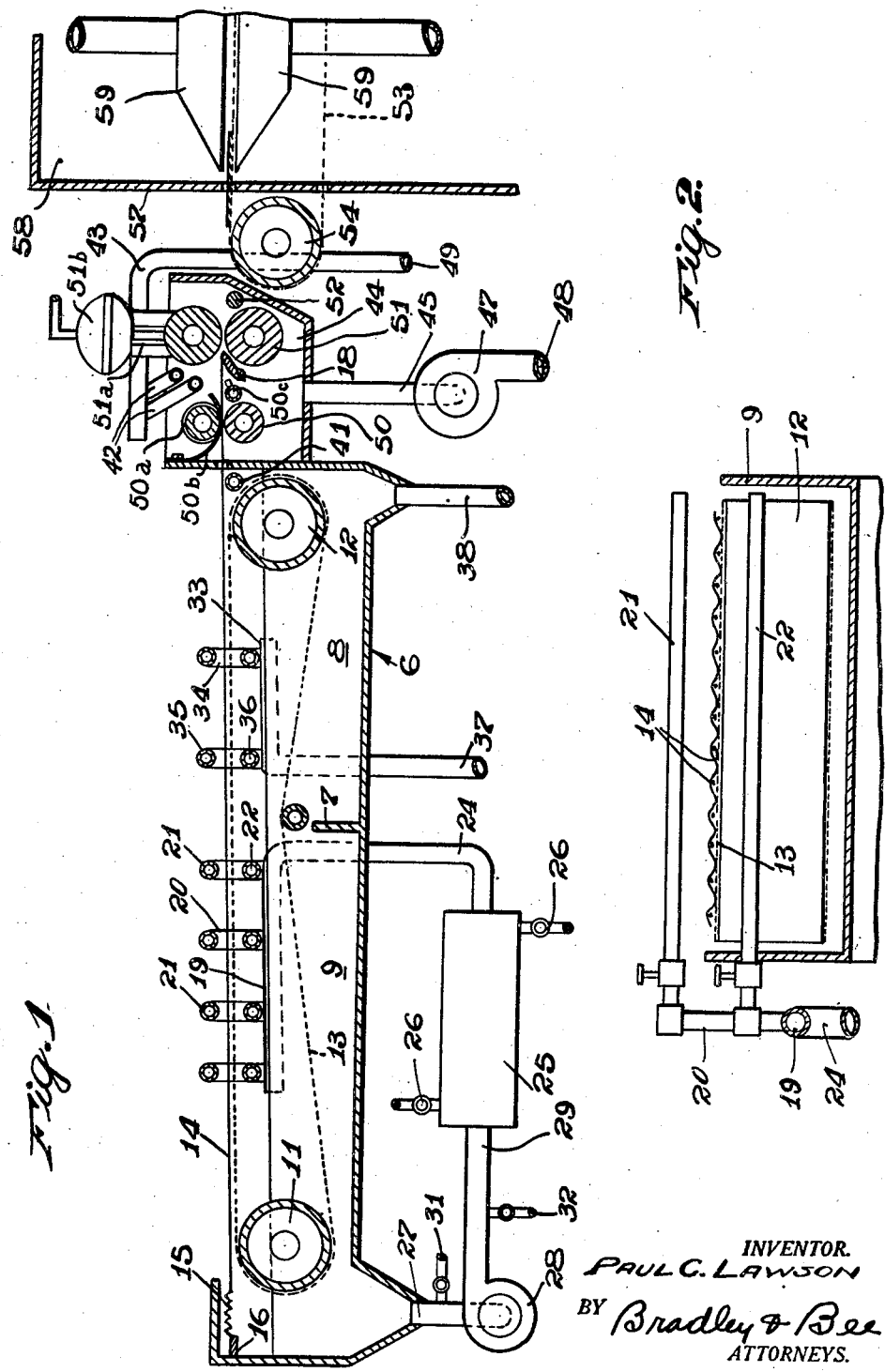

2,254,075

UNITED STATES PATENT OFFICE 2,254,075

PROCESS OF AND APPARATUS FOR WASHING SHEET MATERIAL

Paul C. Lawson, New Kensington, Pa., assignor to Pittsburgh Plate Glass Company, Allegheny County, Pa., a corporation of Pennsylvania Application November 12, 1938, Serial No. 240,113

7 Claims. (Cl. 15—269)

The present invention relates to the washing of sheets of plastic material and it has particular relation to the washing of sheets of material such as are employed as interlayers in safety glass.

One object of the invention is to provide a process of and apparatus for washing sheets of relatively flexible and tacky plastic substances, by application of which the tendency of the sheets to roll up and to stick together at points of contact is reduced or substantially eliminated.

This and other objects of the invention will be apparent from consideration of the following specification and the appended claims.

Plastic materials such as are employed as interlayers between sheets of glass in safety glass customarily are prepared as preformed sheets, which are then assembled between the glass plates and the assembly is subjected to heat and pressure in order to effect a bond between the contacting surfaces. Certain relatively thermoplastic rubber-like resins such as vinyl acetal have recently found favor as the intermediate layer. It is characterized by a high degree of flexibility and a strong tendency for contracting surfaces thereto welded together even at normal or atmospheric temperatures and substantially in the absence of pressure. For this reason stacked sheets tend to stick together, and to obviate the tendency it is customary to dust the surfaces as they are formed, with a water soluble pulverulent material such as borax or sodium carbonate. These latter substances prevent contact between the sticky surfaces when the material is stacked or rolled. However, before the sheets can be employed as interlayers in safety glass it is necessary to subject them to a washing operation with water or other suitable solvent which dissolves the dusting material and leaves the surface of the plastic in its original tacky state.

In order satisfactorily to wash the plastic it is desirable to use fairly warm water, e. g. water at a temperature of about 95° F., more or less. The washing and subsequential handling of large amounts of the resin presents serious difficulty because, by reason of the high flexibility and adhesive character of the resin sheets, they exhibit a strong tendency to adhere to the rolls of the washing apparatus and to stick together whenever the surfaces accidentally contact with each other.

The present invention involves as one of its main features the discovery that if the resin sheets are suitably spread out upon a conveyor and washed first with warm water under appropriate conditions and then substantially without being disturbed are further washed with cool water, the foregoing difficulties can be substantially eliminated.

For a better understanding of the invention reference may now be had to the accompanying drawing in which like numerals refer to like parts throughout, and in which Figure 1 illustrates diagrammatically a convenient embodiment of apparatus for use in practicing the invention.

Figure 2 is a fragmentary cross-sectional view through a conveyor employed for washing the resin, showing the relation of the resin sheets and the conveyor belt.

The apparatus as shown comprises a wash trough 6 divided by partition 7 into compartments 8 and 9. The trough is provided with rollers 11 and 12 having journals in the side walls thereof. A conveyor belt 13 is trained about these rollers and preferably is composed of small links of stainless steel woven together to provide a fabric belt of appropriate width. As will be observed, roller 12 is disposed substantially higher than the roller 11 for a purpose which will be later explained.

A series of spaced parallel stationary wires 14, tensioned by helical springs 15, are stretched longitudinally of the belt 13 in close proximity to the upper surface thereof and are attached at their opposite extremities to transverse bars 16 and 18 of any convenient design. As will be apparent from Figure 2 of the drawing the wires are so disposed that sheets of thermoplastic material when deposited thereupon tend to sag or drape themselves in loops, the bottom portions of which contact with and are supported upon the upper surface of the conveyor belt 13.

Warm water for washing away the film of soluble salts from the surface of the plastic is supplied by an apparatus which includes a conduit 19 extending approximately parallel to the surface of the conveyor belt. Risers 20 from the conduit have lateral branches 21 and 22 that extend across respectively above and below the belt and have suitable apertures (not shown) from which a spray of water at a suitable temperature is supplied to both surfaces of the plastic.

Conduit 19 is joined to a supply conduit 24, which in turn is connected to heater 25 of conventional design, supplied with steam by conduits 26.

The water after use is received in compartment 9 of the trough 6 and is discharged through conduit 27 extending from the bottom thereof to a pump 28 which recirculates it through conduit 29 to the heater 25. In order to prevent water from becoming excessively charged with salts a certain amount is continuously or intermittently drawn away through conduit 31, either to the sewer or to apparatus for recovering the soluble matter contained therein. Makeup water, to replace the water withdrawn, is supplied in a convenient manner, for example by means of conduit 32 leading to a suitable source of supply (not shown).

Water at a lower temperature, e. g. 65 degrees F., or thereabouts, is applied to the washed plastic while it is still on the conveyor, by means of sprayer apparatus including conduit 33, having risers 34, provided with upper and lower lateral branches respectively designated 35 and 36, from which cooled water is showered upon the sheet. The conduit is joined to a conduit 37 leading to a suitable source of supply, e. g. a well (not shown). Waste water from the cooling operation is received in compartment 8 of the trough 6 and is run to waste through a drain 38.

It will be observed that the wires 14 at their forward extremities project beyond the end of the conveyor 13 and function progressively to lift the plastic sheets as they are carried forward by the conveyor and thus obviate any tendency of the latter to continue with the conveyor after having reached the roller 12. Separation of the plastic sheet from the chain conveyor may be assisted by means of a spray of water from a conduit 41 disposed in proximity to the roller 12 and discharging jets of water upwardly against the lower surface of the plastic.

While the plastic sheets are upon the extensions of the wires 14, they are chilled by application of cold water, for example, at a temperature of about 35 or 40 degrees F., supplied from spray conduits 42, which are connected to a supply conduit 43. The water after use is received in a suitable trough 44 which at its bottom is provided with a conduit 45 leading to a pump 47 of conventional design. The pump in turn discharges the water through conduit 48 to a refrigerating apparatus (not shown). This apparatus is connected to supply pipe 43 by means of conduit 49. In order to reduce the amount of warmer water carried from compartment 8 by the plastic sheets to the trough 44 the plastic preferably passes between a pair of small squeegee rollers 50 disposed adjacent to the forward edge of the trough 8.

A groove 50a for each wire 14 is formed in the upper one of the rollers 50 and receives a stiff wire finger 50b, approximately of U shape attached at its rear end to the side of trough 44. The fingers assist in stripping the plastic from the roller and directing it forwardly along the wires.

A spray pipe 50c disposed forwardly of rollers 50 directs jets of water between the lower surface of the plastic and the transverse bar 18 to assist in the chilling operation and also to float the plastic across the bar to a pair of squeegee rollers 51, the upper one of which is journaled in bearings in vertical guideways 51a. Yielding pressure is exerted upon the rollers by means of air diaphragm plunger mechanisms 51b of conventional design, mounted upon the guideways and having a plunger rod connection 51c with the associated bearings of the roller.

It will be understood that the rollers 51 as well as rollers 50 are driven at the same peripheral speed as the carrier belt 13 by means of suitable mechanism (not shown). The rollers preferably are formed of relatively yielding rubber which functions to wipe most of the free water from the surface of the plastic sheet. It would also appear that the rubber by reason of its deformability tends to break away from the surface of the plastic in event of any tendency of the latter to adhere thereto. In order to maintain the temperatures of the rollers as low as possible, the jets from the sprays 42 are projected thereupon. It will be noted that the jets striking the rollers 50 fall upon the forward portions thereof while the jets striking the roller 51 fall upon the rear portions of the latter. The water thus functions to cool the rollers and then runs out upon the plastic sheets to cool them, before it falls into trough 44.

The sheets of plastic, after removal of the water by application of the squeegee rollers passes over guide rollers 52 which feed the material onto the surface of a conveyor belt 53 of a design similar to that of the conveyor 13. Conveyor 53 is carried upon rollers, the rear one 54 of which is shown and which may be driven by suitable mechanism. The conveyor extends forwardly through slots 56 in the rear wall 57 of a conditioning chamber 58. In the latter chamber the plastic sheets pass between flared nozzles 59, which are supplied with air at a temperature of about 65 or 70 degrees F., and at a comparatively low humidity, e. g. about 15 or 20 per cent. This air is conditioned by means of suitable apparatus (not shown) and functions practically instantaneously to evaporate any surface moisture left upon the sheets by the squeegee rollers 51.

The operation of the embodiment of the apparatus herein disclosed is substantially self-evident from the foregoing description. The plastic sheets are merely laid over the wires 14 at the rear extremity thereof and immediately drape themselves in the manner indicated in Figure 2, to contact with the face of a conveyor belt 13. The latter functions to carry the sheets along the wires 14 between the sprayer nozzles or conduits 21 and 22 where they are thoroughly sprayed with water at a temperature of about 95 degrees. By reason of the slope of the conveyor belt the wash water automatically drains backwardly in a direction opposite to the directional travel of the sheets and ultimately drains into the compartment 9 of the trough 6 for reheating and recirculation. It will be apparent that a countercurrent movement of the liquid with respect to the plastic is thus maintained, which insures that the final stages of washing will be effected by water containing the minimum amount of dissolved matter therein.

After the removal of the soluble material from the surface of the plastic the latter is carried by the conveyor between the nozzles 35 and 36 where the water is showered with relatively cool water which reduces the temperature sufficiently to admit of the removal of the plastic and the subsequent transmittal thereof along the projections of the wires 14 to the squeegee rollers 50 and 51. The showers of artificially chilled water from the nozzles 42 upon the rollers 50 and 51, further chill the plastic and the rollers and prevent any tendency of the plastic to adhere to the latter. The plastic after passage through the squeegee rollers is sufficiently chilled and stiffened that it can be transmitted to the conveyor 53 for drying in the chamber 58.

Although only the preferred form of the invention has been shown and described, this is to be considered merely as exemplary. Numerous modifications may be made therein without departure from the spirit of the invention or the scope of the following claims.

What I claim is:

1. A method of washing plastic sheets which comprises depositing the sheets upon spaced parallel wires applying warm water to the sheets to wash them and to make them sufficiently flaccid that they will drape themselves down between the wires, thus contacting the draped portions with the top surface of a conveyor disposed beneath the wires, then moving the conveyor parallel to the wires to slide the washed sheets along the wires, subsequently chilling the sheets to relatively non-tacky, non-flaccid state, progressively moving the conveyor away from the sheets and then drying them.

2. Apparatus for washing plastic sheets comprising a conveyor belt for plastic sheets, means for washing sheets upon the belt, fixed spaced parallel wires disposed adjacent to the surface of the belt and projecting beyond the delivery end thereof and being attached to a transverse bar, spray means for directing jets of water between the surface of the bar and the plastic sheets and squeegee rollers disposed at the delivery side of the bar to receive the plastic sheets therefrom.

3. Apparatus for washing plastic sheets comprising a conveyor belt, fixed parallel wires disposed adjacent the surface of the belt upon which the sheets of plastic are disposed with the portions thereof between the wires in contact with the belt, said wires extending beyond the belt in the direction of delivery and being attached at their extremities to a bar, a spray pipe disposed to direct jets of water between the upper surface of the bar and the adjacent surface of a plastic sheet to float the sheets across the bar, and a pair of squeegee rollers disposed at the delivery side of the bar in position to receive the sheets and to wipe water therefrom.

4. A process of washing soluble salts from the surface of a highly flexible, tacky and thermoplastic sheet, which process comprises flushing said surface with warm water to wash off the soluble salts while the sheet is carried upon a surface of a body providing a support, then flushing the sheet while it is still upon the support in relatively tacky flaccid state with cold water to chill it into a non-tacky, relatively non-flaccid state, and subsequently removing the sheet from the support and removing excess moisture from the surface of the sheet.

5. A process as defined in claim 4 in which removal of the excess water is effected by squeegeeing the sheets with rubber rollers having temperatures lower than that of the plastic.

6. A process as defined in claim 4 in which the material treated is vinyl acetal.

7. Apparatus for washing soluble material from plastic sheets comprising a conveyor belt, means for washing plastic sheets upon the belt with relatively warm water, fixed parallel wires disposed adjacent to the surface of the belt and along which the plastic sheets slide while being washed, said wires extending forwardly beyond the belt, squeegee rollers disposed upon opposite sides of the projecting portions of the wires, the upper of the rollers having peripheral grooves formed therein, fixed fingers disposed in the grooves and projecting between the rollers in order to strip plastic sheets therefrom, additional squeegee rollers disposed at the delivery side of the first-mentioned rollers and spray means for chilling the plastic sheets while they are passing between the rollers.

PAUL C. LAWSON.